W. PAINTER.
Pump-Valves.

No. 141,587.  Patented August 5, 1873.

Witnesses:
Lewis R. Kizer
Charles A. Bond

Inventor:
William Painter

UNITED STATES PATENT OFFICE.

WILLIAM PAINTER, OF BALTIMORE, MARYLAND, ASSIGNOR OF ONE-HALF HIS RIGHT TO LEWIS R. KEIZER, OF SAME PLACE.

IMPROVEMENT IN PUMP-VALVES.

Specification forming part of Letters Patent No. 141,587, dated August 5, 1873; application filed June 23, 1873.

*To all whom it may concern:*

Be it known that I, WILLIAM PAINTER, of the city and county of Baltimore, in the State of Maryland, have invented certain new and useful Improvements in Valves.

My improved valves are adapted to general use as "stop" or "check" valves in any connection; but are more particularly adapted for use in combination with pumps which are intended to lift and force fluid and viscous matter from cess-pools and other similar receptacles for domestic refuse-matter. My invention consists in guarding the valve-port by means of one or more flexible valve-flaps which are arranged to close and guard said port, by an extensive superficial contact of said flap or flaps, either with a fixed coincident and more or less unyielding surface, substantially parallel therewith, or by the joint superficial contact of their coincident faces, and also in such a manner that when at rest said coincident surfaces shall be in close contact in a plane, substantially at right angles to the plane of the valve-port opening, whereby when the said surfaces are forced or drawn apart a delivery-aperture will be presented in a line substantially coincident with the opening in the valve-port, and with a capacity corresponding with that of the port, or approximating thereto to any desired degree; and I do hereby declare that the following specification, taken in connection with the accompanying drawings, is a clear and true description of valves embodying my invention.

In the use of pumps for draining cess-pools and for similar purposes great difficulty has heretofore been experienced in providing a valve suited to the peculiar requirements, and one that would not be choked or clogged by the passage through the pump of such hard and obstructive matter as is usually liable to be deposited in such vaults. For such uses this valve is particularly valuable.

Figure 1:
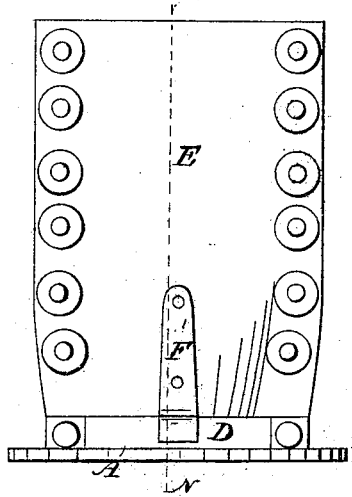
Figure 2:
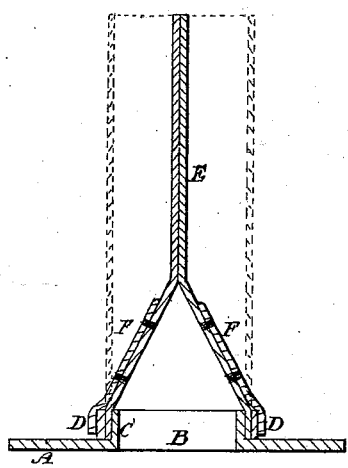
Figure 3:
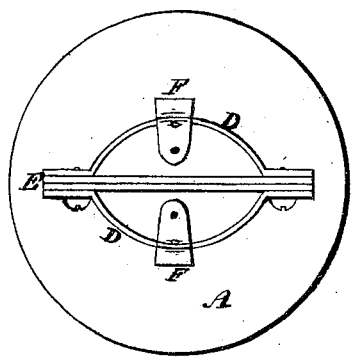

In the annexed drawings, Figure 1 is a side elevation; Fig. 2, a longitudinal section; Fig. 3, a plan view; and Fig. 4, a modified representation of valves embodying my invention.

Referring to the drawings, A denotes the valve-plate, which is fitted to occupy and be secured in the interior of a pump-chamber or a pipe. B denotes a valve-port, which, in this instance, is oval in its outline, and centrally located in the valve-plate. The oval port is surrounded by a flange or collar, as at C, Fig. 2, to which is secured, by clamps D D or other suitable means, the flexible valve-flaps E. I find by experiment that it is desirable to employ flaps composed of soft, elastic, vulcanized rubber, although other flexible material will produce approximately desirable results. From the fact, however, that the rubber, as aforesaid, possesses inherent elasticity and those characteristics which enable it to readily adapt itself to varied conditions and change of form, I prefer it to any other material for this purpose. One method of arranging the flaps is illustrated in Fig. 1, in which it will be seen that the outer edges are riveted to each other from the valve-plate to their upper ends. It is practicable to employ a pair of flaps made in one piece—as for instance, a tubular structure of suitable material may be flattened for a portion of its length and held in position by rivets at the edges or sides, applied as in the instance just described. A better contact of the coincident faces is secured, however, by the use of the two separate flaps. The lower end of the joined flaps will essentially be tubular, as at that point they are made to embrace the collar C, and are secured thereto by the clamps D D.

To prevent the extended ends of the flaps from being forced or drawn back through the valve-port B, said flaps are stiffened or braced by straps F F, which extend longitudinally from the valve-plate on the flaps to a point adjacent to that at which the coincident faces of the flaps engage with close contact. The function of these straps is purely that of a re-enforcing device for preventing the collapse of the normal tubular portion of the valve, and at the same time they allow said portion of the valve to assume any desirable form from that of a tube with a closed or flattened end to that of one with a free and open exit-aperture.

As before stated, when the valve is closed its sides are in close valve contact throughout the greater part of its length. This peculiar feature of an extended superficial bearing surface between the very flexible and yielding coincident faces of the valve-flaps is the important one in connection with the use for which the valve is particularly valuable. For instance, if a piece of solid matter not of greater length than the area of the coincident faces of the valve-flaps should enter it, it will, when closed, pack with valve contact on both or all sides of said solid matter according to its size and its position within the valve.

By reason of the straight, direct, and unobstructed opening through the valve when the flaps are forced or drawn apart, any more or less solid substance of less diameter than the opening B and of an indefinite length offers no objectionable obstruction, as the sides of the valve being yielding and elastic, they readily adapt or adjust themselves to any intervening object, and thereby form a complete closure around it. This feature is also a very important one in dealing with the material referred to.

Figure 4:
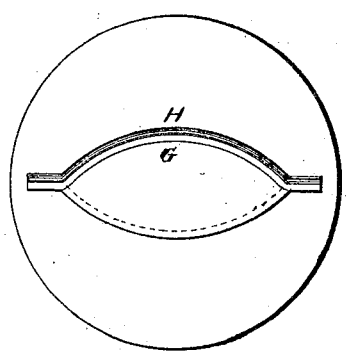

The construction of this valve may, of course, be much varied—as, for instance, one side of it may be made of metal of a concave form, and the other of flexible material which shall conform to the concavity of the rigid side when the valve is closed, and when distended a round or oblong opening will be formed between them. Such a modification embodying my invention is shown in Fig. 4, in which G is the flexible valve-flap, and H the side which presents a parallel coincident surface, which may or may not be clothed with a more or less yielding material for securing more perfect operative relations with the valve-flap. The results in this case, however, will not be as satisfactory as in the form I prefer to employ it and as already described, as will be readily seen.

I am aware that ordinary flexible tubes, in combination with compressing devices, have been employed in various forms as stop-valves for controlling the flow of liquids. Such employment of a flexible tube is well-known. The distinctive features of my valve, however, as to construction, operation, and adaptation are very different, as will be observed from the foregoing specification.

Having thus described my invention, I claim as new and desire to secure by Letters Patent—

1. A valve provided with a flexible valve-flap, having an extensive superficial area, and arranged so that its face will engage in close contact with a coincident face of a corresponding area, in a plane practically at right angles to the plane of the valve-opening, substantially as and for the purposes specified.

2. A valve composed of flexible valve-flaps provided with extensive superficial areas and with coincident faces, which are arranged to engage in close contact with each other, in a plane practically at right angles to the plane of the valve-opening, substantially as and for the purposes specified.

3. In combination with a flap-valve, the stiffeners or braces F F, arranged at the base to prevent collapsing, substantially as described.

WILLIAM PAINTER.

Witnesses:
LEWIS R. KEIZER,
CHARLES H. BOND.